United States Patent Office 3,423,228
Patented Jan. 21, 1969

3,423,228
DEPOSITION OF CATALYTIC NOBLE METALS
Eugene A. Oster, Hamilton, Richard G. Miekka, Natick, and Henri J. R. Maget, Swampscott, Mass., assignors to General Electric Company, a corporation of New York
No Drawing. Filed Mar. 22, 1965, Ser. No. 441,921
U.S. Cl. 117—47                                          2 Claims
Int. Cl. C03c 17/10

ABSTRACT OF THE DISCLOSURE

A platinum metal salt is dissolved in water and the solution rendered alkaline. An anionic surface to be coated is placed in contact with the solution, and a metal borohydride is added to precipitate the platinum metal as a thin, uniform, adherent coating which is bright and reflective so as to form a mirror surface. With a transparent substrate such as glass it is noted that both surfaces of the platinum metal coating are reflective. If a cation exchange membrane is the substrate, precipitation will occur solely on the membrane, since the entry of mobile ions into solution renders the surface of the membrane highly anionic. An additional layer of platinum metal may be applied, if desired, by electrodepositing. The ion exchange membrane may be initially exchanged to remove mobile hydrogen ions.

---

The invention relates to a process of depositing a platinum metal on an anionic surface and to an article of manufacture formed by such process.

The need for a simple process of producing thin, adherent, uniform, corrosion-resistant, bright, reflective metallic coatings on nonmetallic substrates is well recognized. While procedures are available for laying down silver coatings, as in the manufacture of ordinary mirrors, silver metal possesses appreciable chemical activity which precludes its use in corrosive environments. A process of the noted qualifications would be particularly applicable in forming mirrors having utilities from which silver mirrors are precluded. Additionally, such a process could be applied to the formation of improved electrodes for cation exchange membranes.

It is an object of our invention to provide a process of depositing a corrosion resistant material on an anionic surface.

It is a specific object to form a relatively inert reflecting surface.

It is another specific object to form a thin, uniform, corrosion-resistant metal coating on a cation exchange membrane.

It is a further object to form an electrode on a cation exchange membrane.

These and other objects of our invention are accomplished by forming an aqueous solution consisting essentially of water and a platinum metal salt ionized into platinum metal ions. Contact is established between the aqueous solution and an anionic surface. The alkalinity of the aqueous solution is increased to a level sufficient to prevent water decomposition of a metal borohydride which is then introduced. The result is a bright, reflective platinum metal coating on the anionic surface. When the anionic surface is a cation exchange membrane, the coated membrane may be incorporated in a fuel cell construction.

The term "platinum metal" as herein employed includes Group VIII metals of the light and heavy platinum triads. These metals are ruthenium, rhodium, palladium, iridium, osmium, and platinum. The platinum metal is employed in the aqueous solution as a cation. A preferred salt capable of ionizing in water to yield such cations is a platinum metal sulfate such as platinum sulfate, palladium sulfate, etc. Other suitable salts include various platinum metal halide salts such as chloroplatinic acid, chloropalladic acid, etc., as well as sodium, lithium and alkaline earth platinum metal halides such as, for example, sodium chloroplatinate, lithium chloroplatinate, alkaline earth chloroplatinates, etc. Other useful platinum metal salts include hydrated platinum metal oxides such as hydrated platinic oxide, for example. The use of mixtures of platinum metals as well as mixed salts of platinum metals is contemplated.

The platinum metal cations are adsorbed by any anionic surface in contact with the aqueous salt solution. Adsorption is selective to the most anionic surface available. In the absence of a strongly anionic surface, however, platinum metal may be successively deposited on surfaces that are only mildly anionic. For example, in the absence of a more anionic surface platinum metal may be deposited on the surface of ordinary laboratory glassware in contact with the aqueous salt solution. In addition to glass, exemplary materials presenting anionic surfaces capable of adsorbing platinum metal cations include metal oxides, ceramics, cation exchange membranes, and cellulosics. Cation exchange membranes present anionic surfaces when contacted with an aqueous solution, since the mobile cation enters the solution and leaves the immobile anion on the surface of the membrane. In such circumstance, the anion is capable of attracting platinum metal cations which may be present in the aqueous solution.

The adsorbed platinum metal cations are transformed into a thin, uniform, reflective metal coating upon contact with a metal borohydride. It is theorized that a small amount of hydrogen present in the solution reduces a small quantity of platinum metal on the anionic surface. Once crystal nuclei of platinum metal are formed on the anionic surface, the platinum metal catalyzes decomposition of the metal borohydride which in turn liberates additional hydrogen to reduce more of the adsorbed platinum metal ions to the crystalline metallic state.

Preferred metal borohydrides include alkali borohydrides such as sodium borohydride, potassium borohydride, lithium borohydride, etc. Other well-known metal borohydrides such as magnesium borohydride, aluminum borohydride, etc., may also be employed. In order to prevent decomposition of the metal borohydride upon contact with the water in the aqueous solution, it is necessary that the aqueous solution be rendered alkaline at the time the metal borohydride is added thereto. Any base may be employed to this end. It is generally preferred to employ an alkali hydroxide as sodium hydroxide, potassium hydroxide, etc. It is immaterial whether the base is added to the aqueous bath prior to addition of the metal borohydride or simultaneously therewith.

In forming the aqueous solution, the platinum metal salt may be added to a quantity of water to the limits of its solubility. Since platinum metal salts are the most expensive reagents used, it is generally preferred to add only sufficient platinum metal salt to yield the desired platinum metal coating thickness on the anionic surface. For example, 0.9 mg. of platinum metal in the form of a salt is added to water in order to provide a coating of 0.1 mg./cm.$^2$ on an anionic surface of 9 cm.$^2$ Once the amount of platinum metal present in the aqueous solution is determined, the amount of metal borohydride may be calculated from stoichiometric relationships. As an alternate, less preferred procedure, it is possible to provide an excess of platinum metal in the aqueous solution and to control the amount of metal borohydride added in order to obtain the desired coating thickness. In order to prevent water decomposition of the metal borohydride, a stabilizing amount of base is added to the aqueous solution. Since the base is a relatively low cost reagent, it is generally preferred that an excess amount be present in order to prevent any waste of the metal borohydride. It is contemplated, of course, that the base may be employed in concentrations less than that necessary to completely prevent metal borohydride decomposition, although such procedure is not preferred. In this regard, it is noted that small amounts of certain metal borohydrides are capable of dissolving in aqueous solutions without the addition of a base. From the foregoing, it is apparent that no particular concentration of proportion of ingredients is critical to the practice of the invention. Knowing the coating thickness desired, specific proportions may be obtained by reference to stoichiometric relationships.

The coated articles produced by the process consist of a layer of platinum metal on a substrate having an anionic surface. While there is no theoretical limit to the thickness of the platinum metal coatings obtainable, it is generally preferred to utilize the minimum amounts of platinum metal consistent with the intended use. In forming a mirrored surface, the minimum amount of metal to yield a reflective surrface may be obtained by observation of the substrate during plating. When platinum metals are deposited by our process on a transparent substrate, both the surfaces adjacent and remote from the substrate are noted to be reflective.

The platinum metal coatings deposited according to our process on cation exchange membranes exhibit, even with appreciably smaller quantities of platinum metal, an electrocatalytic activity equivalent to that of conventional fuel cell electrodes. Films of as little as about 0.5 mg./cm.$^2$ platinum metal exhibit acceptable levels of electrocatalytic activity. The platinum metal coating penetrates the surface of the membrane to a depth of from 1 to 5 mils providing an intimate contact between the catalyst and the electrolyte. A further advantage is that the platinum metal electrode is directly bonded to the ion exchange membrane without resort to pressure laminating techniques conventionally employed. Also, the requirement that the electrode have sufficient structural strength to be separately handled is eliminated. Platinum metal films of about 0.1 mg./cm.$^2$ may be used as a fuel cell electrode without resort to a separate current collector, although a separate current collector is preferred for high current applications.

If desired, the chemically deposited platinum metal coating may be employed in combination with additional quantities of platinum metal electrocatalyst. The platinum metal coating may, for example, be laminated with a conventional fuel cell electrode. According to one aspect of the invention, the platinum metal coating may be used as a cathode for electrodeposition of additional platinum metal or alloys of platinum metal either with other platinum metals or with base metals. While conventional platinum metal or alloy plating baths may be employed, this procedure offers unique advantages in that the platinum metal is electroplated directly to the ion exchange membrane rather than to a current collector which must be later pressed into contact with an ion exchange membrane as is conventional practice.

The platinum metal coatings formed on anionic substrates according to our process are thin, adherent, uniform, corrosion-resistant, bright, reflective, electrically conductive, and electrocatalytic. In addition to use in forming mirrors and fuel cell electrodes as previously discussed, the invention is applicable to a wide variety of uses calling for one or more of the particular advantages above set out. Our invention may find utility, for example, in connection with electrical equipment such as leads, contacts, switches, etc.; in connection with jewelry and ornamentation such as platinum metal coated tableware, flatware, watches, rings, etc.; in replacement of gold leaf lettering; in preparing metal coated diamond bort for industrial applications; in fabricating equipment for handling highly corrosive materials; in fabricating equipment capable of operating in highly corrosive environments; in fabricating equipment capable of operating in ordinary environments with no trace of corrosion; and in connection with platinum metal catalysis generally.

The following examples are for purposes of illustration and are not for purposes of limitation:

Example 1

A 50 ml. glass beaker was filled approximately ⅔ full with distilled water. Ten drops (0.5 cc.) of a saturated solution of platinum sulfate (0.0366 gm. of platinum per gram of solution) were added, and the solution stirred until well mixed. Next 10 drops of a solution containing 5 gm. of sodium borohydride and 300 gm. of potassium hydroxide per liter were added. The solution was stirred briefly and then set aside. In about 5 minutes a black deposit began to form on the walls of the beaker accompanied by hydrogen evolution due to hydrolysis of the sodium borohydride. The black deposit gradually changed to gray and then a bright mirror deposit as deposition of the platinum metal continued. A continuous opaque mirror formed in about 20 minutes after the borohydride addition. After mirroring was fully completed, the beaker was emptied, rinsed with distilled water, and dried. The mirror deposit was extremely adherent and could be polished by vigorous rubbing with a soft cloth without removing any of the deposit.

Example 2

A cation exchange membrane was mirrored by suspension in a solution of platinum sulfate, sodium borohydride, and potassium hydroxide similar to that employed in Example 1. The cation exchange membrane was comprised of polystyrene sulfonic acid crosslinked with divinylbenzene contained in a matrix of polyvinylidene fluoride. Such membranes are disclosed in commonly assigned application Ser. No. 413,940, filed Nov. 25, 1964 and now abandoned. Mirror formation was much more rapid than on glass, complete mirroring being achieved in about 10 minutes. The mirror exhibited no tendency toward peeling. Examination of the mirrored membrane showed that a black deposit of platinum had penetrated to a depth of from 1 to 2 mils below the membrane surface.

Example 3

The procedure of Example 2 was repeated, except that a cation exchange membrane was employed comprised of polystyrene sulfonic acid crosslinked with divinylbenzene and contained in a matrix of a copolymer of chlorotrifluoroethylene and vinylidene fluoride. Such membranes are disclosed in commonly assigned application Ser. No. 414,011, filed Nov. 25, 1964. Mirroring occurred in about 10 minutes and examination after mirroring showed that no black platinum was present at or beneath the surface. Since the membrane was initially transparent, the surface of the platinum metal adjacent the membrane surface was viewed through the membrane and noted to be bright and reflective.

Example 4

The procedure of Example 2 was repeated, except that the membrane was ion-exchanged into the sodium form with sodium hydroxide before mirroring. Results were similar to those of Example 2, except that a longer time, approximately 15 to 20 minutes, was required before the membrane surface became brightly mirrored. Penetration of the black platinum extended to a depth of from 3 to 4 mils below the membrane surface.

The mirrored membrane was next submerged in an aqueous solution containing 3 percent by weight chloroplatinic acid and 0.05 percent by weight lead acetate. The membrane was platinized for 20 minutes at a current density of 500 milliamperes per square inch. During this period the mirrored surface became uniformly coated with platinum black.

The plated membrane was then ion exchanged back into the hydrogen form with sulfuric acid and mounted in a fuel cell structure. The platinized surface was employed as one electrode and a conventional electrode formed of platinum black and approximately 15 percent by weight polytetrafluoroethylene was mounted adjacent the opposite surface of the membrane. Hydrogen was supplied to each of the electrodes and current from an external source was driven through the cell. The polarization of the platinized electrode increased linearly with increasing current until a polarization of 0.116 volt was noted at a current density of 150 ma./cm.$^2$. Using the current interruption technique with a Kordesch-Marko measuring device, resistance-free polarization of the platinized electrode at 150 ma./cm.$^2$ was estimated to be 0.075 volt or less, compared with 0.020 volt for a typical platinum black-polytetrafluoroethylene electrode containing approximately 5 mg./cm.$^2$ platinum.

What we claim as new and desire to secure by Letters Patent of the United States is:

1. A process of producing an adherent mirror coating on an anionic surface comprising
   forming an aqueous solution consisting essentially of water and platinum metal sulfate ionized into platinum metal ions in which the quantity of platinum metal ions corresponds to the quantity of platinum metal to be deposited,
   contacting the aqueous solution with a transparent substrate having an anionic surface,
   rendering alkaline the aqueous solution to a level sufficient to prevent water decomposition of a metal borohydride, and
   introducing the metal borohydride into the aqueous solution in an amount sufficient to completely precipitate the platinum metal on the substrate as a uniform, thin, adherent, mirror coating.

2. A process of producing an adherent mirror coating on an anionic surface comprising
   forming an aqueous solution consisting essentially of water and platinum salt ionized into platinum ions in which the quantity of platinum ions corresponds to the quantity of platinum metal to be deposited.
   contacting the aqueous solution with a transparent substrate having an anionic surface,
   rendering alkaline the aqueous solution to a level sufficient to prevent water decomposition of a metal borohydride, and
   introducing the metal borohydride into the aqueous solution in an amount sufficient to completely precipitate the platinum on the substrate as a uniform, thin, adherent, mirror coating.

References Cited

UNITED STATES PATENTS

| | | | |
|---|---|---|---|
| 2,834,724 | 5/1958 | Mendes | 204—30 |
| 2,968,578 | 1/1961 | Mochel | 117—54 |
| 3,207,600 | 9/1965 | Hirai et al. | 204—20 |
| 3,228,797 | 1/1966 | Brown et al. | 204—20 |
| 3,296,102 | 1/1967 | Worsham | 204—47 |

JOHN H. MACK, *Primary Examiner.*

T. TUFARIELLO, *Assistant Examiner.*

U.S. Cl. X.R.

204—20, 22, 29